United States Patent [19]

Gau

[11] Patent Number: 5,116,719
[45] Date of Patent: May 26, 1992

[54] TOP POLE PROFILE FOR POLE TIP TRIMMING

[75] Inventor: George J. Gau, Santa Barbara, Calif.

[73] Assignee: Seagate Technology, Inc., Scotts Valley, Calif.

[21] Appl. No.: 480,250

[22] Filed: Feb. 15, 1990

[51] Int. Cl.$^5$ .................. G03F 7/36; G11B 5/187
[52] U.S. Cl. .................... 430/313; 360/122; 360/123; 360/126; 29/603
[58] Field of Search .......... 430/313; 29/603; 360/123, 126, 122

[56] References Cited

U.S. PATENT DOCUMENTS

| | | | |
|---|---|---|---|
| 3,766,640 | 10/1973 | Hahn, Jr. | 29/603 |
| 4,399,479 | 8/1983 | Meckel | 360/126 |
| 4,418,472 | 12/1983 | Lorenze, Jr. | 29/603 |
| 4,425,701 | 1/1984 | Takahashi et al. | 29/603 |
| 4,436,593 | 3/1984 | Osborne et al. | 204/15 |
| 4,731,157 | 3/1988 | Lazzari | 156/643 |
| 4,791,719 | 12/1988 | Kobayashi et al. | 29/603 |
| 4,804,816 | 2/1989 | Hata | 29/603 |
| 4,839,197 | 6/1989 | Henderson | 360/119 |
| 4,899,434 | 2/1990 | Roberts | 29/603 |
| 4,970,615 | 11/1990 | Gau | 360/122 |
| 4,971,897 | 11/1990 | Kawabe et al. | 430/313 |
| 4,985,985 | 1/1991 | Das | 29/603 |

OTHER PUBLICATIONS

"The Effect of Sensitizer Chemistry on Decarboxylation-Type Image Reversal Systems" by Grunwald et al. published in SPIE vol. 1086, *Advances in Resist Technology and Processing VI* (1989), pp. 129-137.

Primary Examiner—Marion E. McCamish
Assistant Examiner—Christopher D. RoDee
Attorney, Agent, or Firm—Kinney & Lange

[57] ABSTRACT

A thin film magnetic read/write head is manufactured using an improved pole tip alignment process. The upper pole tip is formed with positively sloped profile sides for improved alignment between the profile sides of the top pole and the profile sides of the protective layer used during an ion milling alignment process.

25 Claims, 3 Drawing Sheets

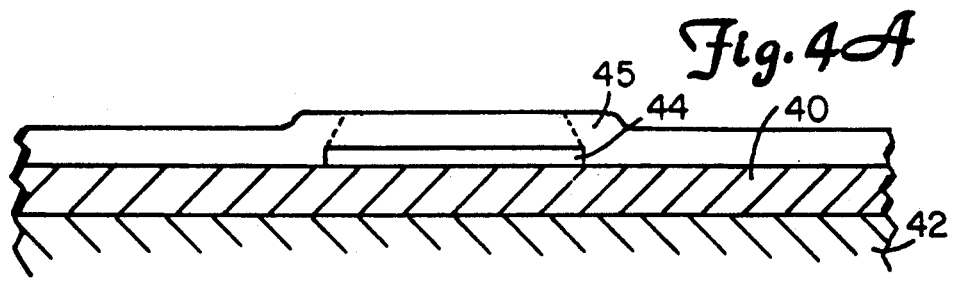
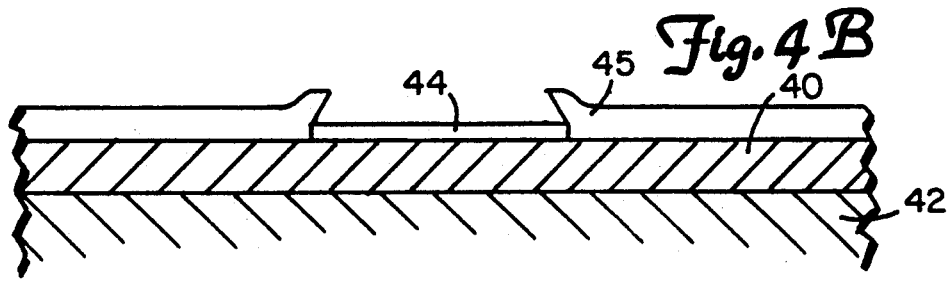
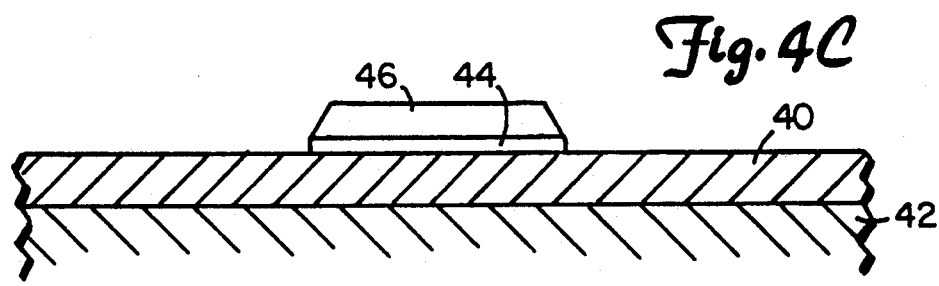
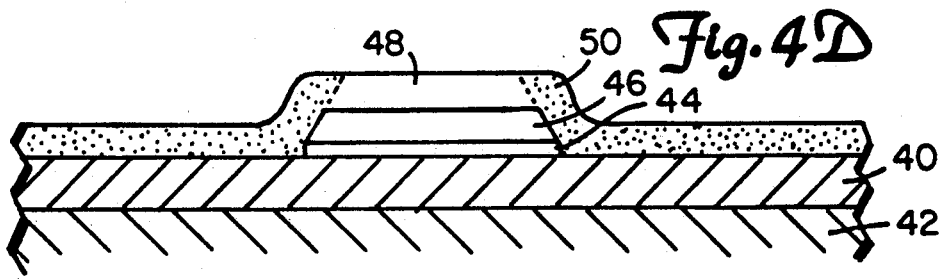
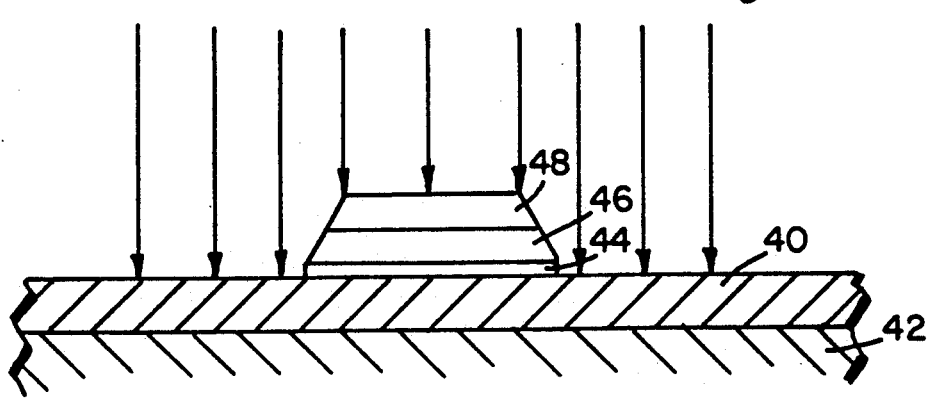

TOP POLE PROFILE FOR POLE TIP TRIMMING

REFERENCE TO CO-PENDING APPLICATIONS

Reference is hereby made to the following co-pending patent applications filed on even date herewith and assigned to the same assignee: "SELF ALIGNED MAGNETIC POLES USING SACRIFICIAL MASK" Ser. No. 07/480,278, now U.S. Pat. No. 4,922,902; and "METHOD FOR ALIGNING POLE TIPS IN A T-HIN FILM HEAD" Ser. No. 07/480,558.

BACKGROUND OF THE INVENTION

1. Field of the Invention.

The present invention relates to the manufacture of thin film magnetic read write heads. In particular, the invention relates to the use of a positively sloped top pole to facilitate an ion milling alignment process.

2. Description of the Prior Art.

The quest for increased data storage density has continually driven data storage technology. Thin film magnetic read/write heads have greatly increased the magnitude of data storage density obtainable in a magnetic storage medium. This increase has been largely due to the small size of thin film magnetic heads.

In a thin film magnetic head, a gap area is formed at the tips of two legs or pole pieces used to form the flux path of the thin film head. This flux path is closed at the end opposite the gap area by a backgap via. Conductors carry electric current through the center of the thin film head and between the two magnetic legs. When an electric current flows through these conductors, a magnetic flux is caused to flow in the core (i.e. the two leg pieces) of the thin film head. During operation, magnetic fields may be impressed upon a magnetic storage medium by this magnetic flux. As the flux spans the gap area, a magnetic fringe field emanates from the pole tips. Conversely, information may be recovered from a magnetic storage medium, because a varying magnetic field near the gap area induces an electrical current to flow in the conductors.

One area in which thin film head performance may be enhanced is in the alignment between upper and lower pole tips. This alignment is critical because it defines the characteristic fringe field. The magnetic field density and gradient are directly related to this alignment.

A technique which provides better pole tip alignment begins with a bottom pole deposited upon a substrate, in which the bottom pole is substantially wider than desired. Next an insulator is deposited upon the bottom pole and forms the gap area in the completed pole tip. A top pole is deposited upon the insulator. The top pole is deposited by using a photoresist process comprising: depositing a photoresist layer; exposing the photoresist layer to radiation; and applying a photoresist developer which chemically develops out (i.e. removes or "etches") out a three dimensional relief in the layer. The top pole piece is deposited upon the insulator and formed using a conventional positive photoresist with a "positively sloped profile." A positively sloped profile is a profile which is wider at the top or outer edge than at bottom, inner edge closest to the substrate. The resulting top pole formed by the positive tone photoresist has a profile with negatively sloped sides.

A protective photoresist layer may then be deposited upon the top pole. The protective photoresist layer comprises positive photoresist having a positive tone with a positively sloped profile. The nonaligned pole tip structure is aligned using a material removal process such as ion milling. In ion milling, high energy ions bombard the surface to remove the nonaligned portions of the pole tip. The protective photoresist mask shields the top pole and a portion of the insulating gap material and bottom pole from the high energy ions. This leaves behind a substantially aligned pole tip structure.

There are a number of problems associated with this alignment technique. The protective photoresist mask and the top pole have profiles with opposing slopes. This causes a lip to be formed at their intersection. This lip provides an area for redeposition of milled material during the ion milling process. The self masking of the top pole during ion milling limits the accuracy of the ultimate pole tip width.

SUMMARY OF THE INVENTION.

The present invention provides improved data storage density in a magnetic storage medium through a thin film magnetic head having more accurately aligned top and bottom pole pieces than previously possible. Rather than using a positive tone photoresist for forming the top pole, a negative tone photoresist (i.e. sloping inward) is used such that the top pole profile has a positive slope. This provides a smooth intersection and a continuous slope between the protective photoresist mask and the top pole. Top and bottom poles typically have a thickness (i.e. film depth) in a range of about one micron to about five microns. The thickness of the gap layer typically ranges from about 0.1 microns to one micron. The thickness of the photoresist mask typically ranges from about one micron to about seven microns.

The resultant pole structure is more suitable for the ion milling alignment process than the top pole structure formed with positive tone photoresist. The undesirable lip formed at the interface between the protective photoresist layer and the top pole is eliminated. Self masking of the top pole and the associated redeposition during the milling process is also reduced.

BRIEF DESCRIPTION OF THE DRAWINGS

FIGS. 4A–4E are cross sectional views of the process used to fabricate the pole tip pieces of the present invention, prior to aligning the pole tips with an ion milling technique.

DETAILED DESCRIPTION OF THE PREFERRED EMBODIMENTS

The miniaturization of magnetic heads has been driven by the quest for increased data storage densities on magnetic storage media. This has lead to integrated thin film magnetic heads in which the manufacturing process bears many similarities to the manufacturing process used to fabricate integrated electronic circuits. The substantial two dimensionality of thin film heads permits the use of magnetic films with higher permeability and higher saturation magnetization providing better performance while the minute size of the head further increases track densities. Additionally the ability to fabricate the heads in an array provides significant cost advantages.

Fabrication of thin film magnetic heads uses a photolithographic process in which the device pattern is defined using a latent image in a photoresist layer. The latent image is developed out leaving a three dimensional relief profile. The relief may then be filled with the appropriate material for that layer of the thin film head.

Figure 1:
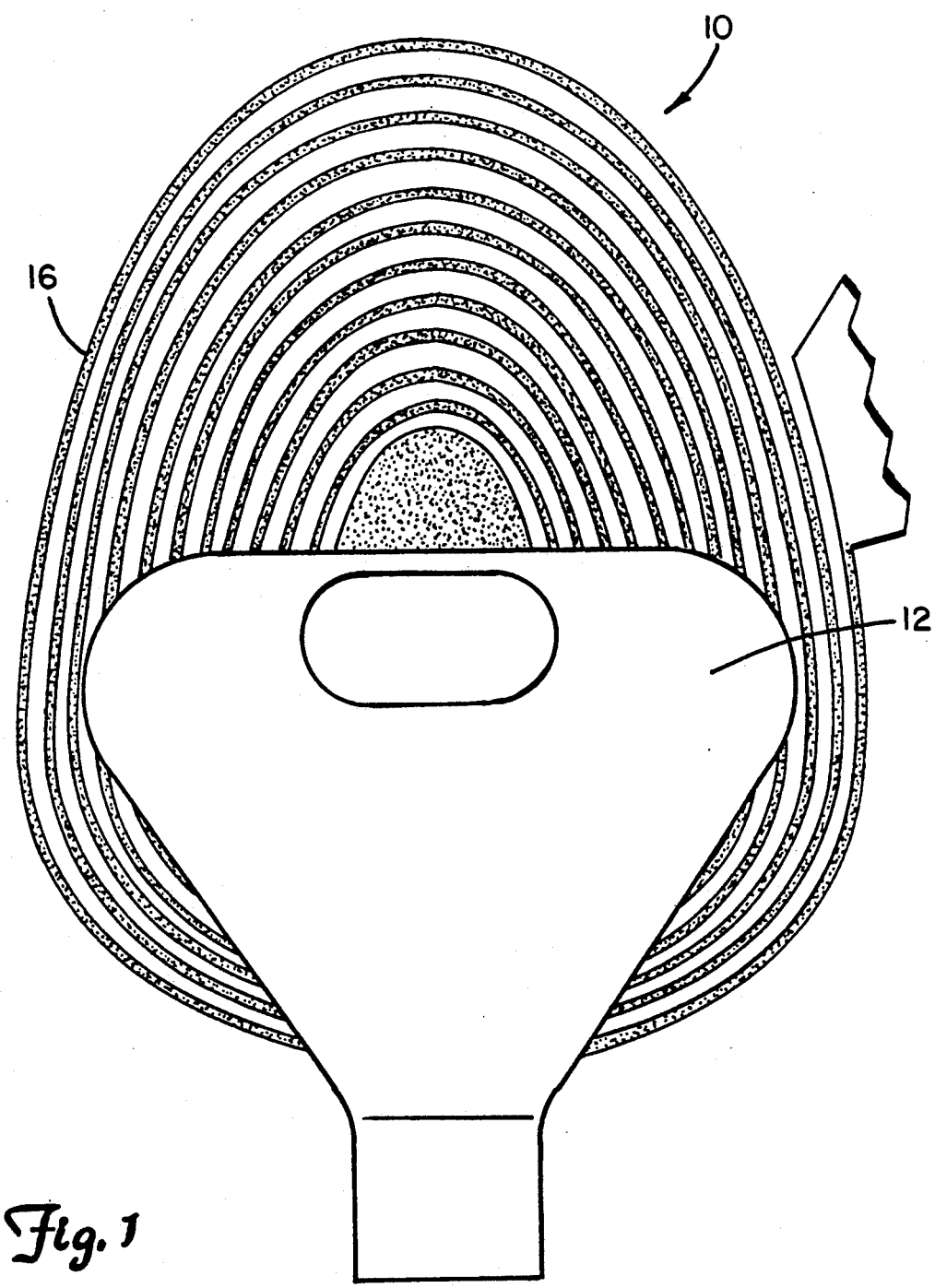
FIG. 1 is a top view of a thin film magnetic read/write head.
Figure 2:
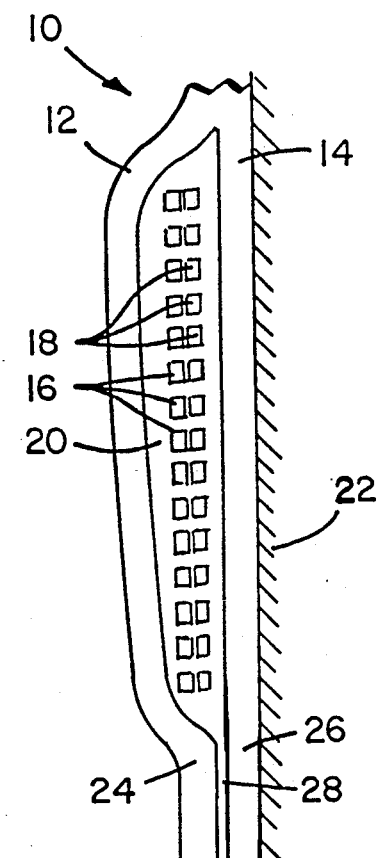
FIG. 2 is a side view of the thin film head of FIG. 1.

A multiturn inductive thin film magnetic head 10 is shown schematically in FIGS. 1 and 2. FIG. 1 is a top view of thin film head 10 and FIG. 2 is a side cross sectional view. Thin film head 10 includes top and bottom magnetic thin film core legs 12 and 14 which typically comprise a nickel iron alloy. Photolithography is used to define the geometry of both top and bottom magnetic core legs 12 and 14. Conductive coils 16 and 18 extend between top and bottom magnetic thin film core legs 12 and 14 and are electrically insulated from top and bottom magnetic core legs 12 and 14 by an insulating layer 20. Thin film head is deposited upon a nonmagnetic substrate 22 comprising, for example, a ceramic compound such as $Al_2O_3$—TiC.

In fabricating thin film head 10, several separate pattern transfer processes are used to deposit head 10 upon substrate 22. These transfer processes include liftoff, wet chemical etching, plating, and sputtering. A typical head fabrication process may account for more than a dozen masking levels and more than thirty processing steps including deposition, plating and etching.

During fabrication, heads similar to thin film head 10 are deposited across the entire surface of substrate 22. After the layers of head 10 are deposited as depicted in FIGS. 1 and 2, substrate 22 is "diced" or sliced into many individual thin film heads, each carried by a portion of substrate 22 such that an upper pole tip 24, a lower pole tip 26 and a gap 28 are exposed. Pole tips 24 and 26 and gap 28 (and the portion of substrate 22 underlying them) are then lapped in a direction generally inward, toward the center of then film head 10 to achieve the desired dimensions. This lapping process is a grinding process in which the exposed portion of top and bottom pole tips 24 and 26 and gap 28 are applied to an abrasive, such as a diamond slurry. Electrical contacts (not shown) are connected to conductors 16 and 18. The completed head is next attached to a carrying fixture (not shown) for use in reading and writing data on a magnetic storage medium such as a computer disk.

In operation, a magnetic storage medium is placed near upper and lower pole tips 24 and 26. During the read operation, the changing magnetic field of the moving storage medium impresses a magnetic field upon upper and lower pole tips 24 and 26. This magnetic field is carried by top and bottom magnetic film cores 12 and 14 around conductors 16 and 18. This magnetic field induces electrical current to flow through conductors 16 and 18 which may be detected using electrical detection circuitry. The electrical current is representative of the changing magnetic field produced by the moving magnetic storage medium.

During a write operation, an electrical current is caused to flow in conductor 16 or conductor 18. This electric current induces a magnetic field in top and bottom magnetic film cores 12 and 14 and causes a magnetic field to cross gap 28 between upper and lower pole tips 24 and 26. The construction of upper and lower pole tips 24 and 26 and gap 28 causes a fringe field to extend beyond the boundary of pole tips 24 and 26 and into the proximate magnetic storage medium. This fringe field may be used to impress magnetic fields upon the storage medium to write data.

There are two methods used to fabricate magnetic thin film heads, either additive or subtractive. The additive approach is the dominant approach and involves a series of processing steps in which the various layers of thin film head 10 are deposited upon substrate 22. The highest track density achievable is strongly influenced by the accuracy of alignment of upper and lower pole tips 24 and 26 and the size of tips 24 and 26. Magnetic pole tips typically have a pole thickness in the range of about one micron to about five microns depending upon the design criteria, i.e. a thicker pole for better overwriting efficiency and a thinner pole for increased resolution capability during the readback operation. The side profile (i.e. the slope of the sides) of pole tips 24 and 26 is of great significance since off-track recording properties are strongly influenced by the side fringing of the magnetic field emanating from pole tips 24 and 26. The physical shape of upper and lower pole tips 24 and 26 and gap 28 significantly affect the performance of thin film head 10 during reading and writing. This side fringing will play a key role in the formation of the side erasure band, depending upon the strength of the side fringing field and corresponding field gradient distribution.

The accuracy of the alignment between top and bottom pole pieces 24 and 26 may be improved with a material removal process such as ion milling. In an ion milling process, high energy ions bombard the surface of thin film head 10 to remove unwanted portions of some of the deposited layers selectively. A protective mask protects a portion of pole tips 24 and 26. The high energy ions mill away the exposed portions of the thin film head 10 such that the nonaligned portions of gap 28 and lower pole tip 26 are removed.

Figure 3:
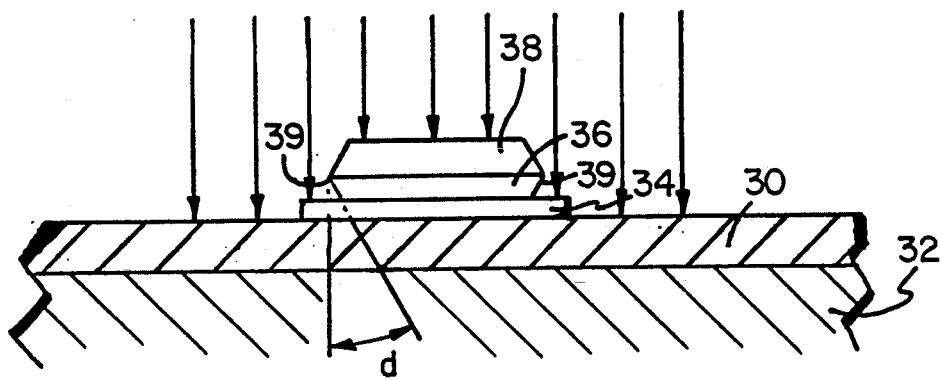
FIG. 3 is a cross sectional view of a prior art pole tip structure prior to aligning the pole tip pieces with an ion milling technique.

FIG. 3 shows a prior art pole tip configuration prior to ion milling. In FIG. 3 an infinite width bottom pole 30 (i.e. substantially wider than the final width) is shown deposited upon a substrate 32. Insulating gap material 34 is deposited upon infinite width bottom pole 30. A top pole 36 is next deposited upon insulating gap material 34 and formed between two photoresist dams (not shown). These photoresist dams have a "positive tone" (i.e. a positively sloped profile in which the dams are wider at their base). This positive slope in the profiles of the photoresist dams results in the top pole 36 having a negatively sloped profile as shown in FIG. 3. In other words, top pole 36 is narrower at its base (the portion closest to substrate 32) than at its top. Finally, a protective photoresist layer 38 is deposited upon upper pole tip 36. A positive photoresist having a positive tone is used for protective photoresist layer 38, which results in the structure as shown in FIG. 3. This fabrication process provides an abrupt change between the slopes of the profiles of top pole 36 and protective photoresist layer 38 at the interface between the two. The negative slope (represented by angle d in FIG. 3) in the profile of top pole 36 forms a lip 39 on each side of top pole 36. The pole tip region is then exposed to energetic ions indicated by the arrows in FIG. 3. These ions bombard the exposed surfaces thereby milling away the exposed layers. Protective photoresist layer 38 covers top pole 36 such that following the ion milling process a substantially aligned top pole 36 gap material 34 and lower pole 30 structure remain.

It has been discovered, however, that lip 39 in top pole 36 shown in FIG. 3 creates several problems which limit the attainable alignment between pole tips 36 and 30 and gap material 34. Lip 39 "self masks" upper pole 36 during ion milling. Self masking is a phenomenon in which a layer acts as its own mask, shielding itself during the material removal process. Furthermore, lip 39 provides a sheltered area in which debris collects during the material removal process.

FIGS. 4A–4E show the steps of forming the present invention. In FIG. 4A, an infinite width bottom pole 40 is deposited upon a substrate 42. An insulating gap layer 44 is deposited upon bottom pole 40. A negative tone photoresist layer 45 is deposited upon bottom pole 40 and insulating gap layer 44. By exposing photoresist layer 45 to radiation through a mask, a latent image is formed as indicated by the dashed lines in layer 45. This can also be achieved by using an image reversal process of positive tone photoresist. The latent image is chemically developed out (i.e. removed) as shown in FIG. 4B. FIG. 4B shows the three dimensional relief formed in negative tone photoresist layer 45 above insulating gap layer 44. The latent image forms two "dams" between which core material is deposited. FIG. 4C shows a top pole 46 with a positively sloped profile. Top pole 46 is formed by depositing magnetic core material in the three dimensional relief of FIG. 4B. Photoresist layer 45 is removed using a chemical etchant which leaves positively sloped top pole 46.

If, alteratively, an image reversal process is used to form top pole 46, a positive tone photoresist layer is deposited upon bottom pole 40 and exposed to radiation through a mask. The photoresist is then baked followed by a flood radiation exposure. When the positive tone resist is developed, the portion masked off is removed and leaves behind the latent image which has a negatively sloped profile.

FIG. 4D shows a conventional positive tone photoresist layer 50 deposited upon bottom pole 40, insulating gap layer 44 and top pole 46. Photoresist layer 50 is exposed to radiation through a mask which leaves a latent image as indicated by the dashed lines in FIG. 4D. After development, the remaining resist is hard baked at elevated temperatures to serve as the masking layer for the subsequent pole trimming.

FIG. 4E shows the pole tip structure of the present invention prior to ion milling. A layer of protective photoresist 48 is deposited upon top pole tip 46. Protective photoresist layer 48 used to protect pole tips 46 and 40 and gap 44 during the ion milling alignment process is formed using positive tone photoresist 50 such that the sides of the profile of photoresist 48 have a positive slope. Comparing top pole tip 46 in FIG. 4E with top pole tip 36 in FIG. 3, the lip and incongruence between the slopes of the side profiles of top pole tip 36 and protective photoresist layer 38 in FIG. 3 have been removed in the top pole tip 46 and protective photoresist layer 48 structure of FIG. 4E. In fact, the sides of the top pole 46 and protective photoresist layer 48 may be formed as a continuous sloping wall as shown in FIG. 4E.

Typically, top and bottom pole tips 40 and 46 have a thickness (i.e. film depth) in a range from about one micron to about five microns. Gap material layer 44 typically ranges in thickness from about 0.1 microns to about one micron. Photoresist mask layer 48 has a thickness which typically ranges from about one micron to about seven microns.

The arrows from above in FIG. 4E indicate the direction of energetic ions during the material removal process (ion milling) used for aligning top pole tip 46 gap material 44 and bottom pole tip 40. Ion milling, reactive ion milling, sputter etching or chemical etching could all be used to align the pole tips. Following milling, any portion of photoresist mask layer 48 remaining on top pole tip 46 is removed with a photoresist chemical enchant. In the structure of FIG. 4E, there is no lip area in which redeposition of the milled material may occur. The self masking problem associated with top pole tip 36 of FIG. 3 is also eliminated in FIG. 4E by the positively sloped sides in the profile of upper pole tip 46.

Although the present invention has been described with reference to preferred embodiments, workers skilled in the art will recognize that changes may be made in formed detail without departing from the spirit and scope of the invention. For example, the slope of the profile sides of the top pole tip and protective photoresist layer may be altered together or individually as required. Furthermore, the upper pole tip may be formed using materials other than negative tone photoresist and the protective photoresist layer may comprise any type of protective material useful in the alignment process.

What is claimed is:

1. A method for manufacturing a pole tip structure in a thin film magnetic transducer carried by a substrate, the thin film magnetic transducer of the type used for reading and writing information upon a magnetic storage medium, the method comprising the steps of:

depositing a magnetic bottom pole piece upon the substrate;

depositing an insulating gap layer upon the magnetic bottom pole piece;

depositing photoresist dams on the insulating gap layer, wherein the photoresist dams have opposed negatively sloped profiles which define a three dimensional relief;

depositing a magnetic top pole piece upon the insulating gap layer in the three dimensional relief formed by the photoresist dams, whereby the magnetic top pole piece has a positively sloped profile;

depositing a mask upon the magnetic top pole piece wherein the mask is aligned with the top pole piece; and exposing the mask and the magnetic bottom pole piece to an ion milling source whereby nonaligned portions of the magnetic bottom pole piece are removed.

2. The method of claim 1 wherein depositing photoresist dams comprises the steps of:

depositing a negative tone photoresist layer;

exposing the negative tone photoresist layer to actinic radiation through a radiation mask; and developing the negative tone photoresist whereby the three dimensional relief is formed in the negative tone photoresist layer.

3. The method of claim 1 wherein depositing photoresist dams comprises the steps of:

depositing a positive tone photoresist layer; and performing an image reversal process whereby the three dimensional relief is formed in the positive tone photoresist layer.

4. The method of claim 3 wherein performing an image reversal process comprises:

exposing the positive tone photoresist to radiation through a radiation mask;

baking the positive tone photoresist;

flood exposing the positive tone photoresist to radiation; and developing the positive tone photoresist thereby forming the three dimensional relief.

5. The method of claim 1 wherein the mask comprises a positive tone photoresist having a positively sloped profile.

6. The method of claim 5 wherein the positively sloped profile of the positive tone photoresist is about the same as the positively sloped profile of the top pole piece.

7. The method of claim 6 wherein the profile of the positive tone photoresist and the profile of the top pole piece are in substantial alignment.

8. The method of claim 1 wherein the magnetic top pole piece has a thickness in a range of about 1 micron to about 5 microns.

9. The method of claim 1 wherein the mask has a thickness in a range of about 1 micron to about 7 microns.

10. The method of claim 1 wherein the insulating gap layer has a thickness in a range of about 0.1 microns to about 1 micron.

11. The method of claim 1 wherein the magnetic bottom pole piece has a thickness in a range of about 1 micron to about 5 microns.

12. The method of claim 1 wherein the mask has a thickness in a range of about 1 micron to about 7 microns and the magnetic bottom pole piece has a thickness in a range of about 1 micron to about 5 microns.

13. The method of claim 1 wherein the mask has a thickness in a range of about 1 micron to about 7 microns, the insulating gap layer has a thickness in a range of about 0.1 microns to about 1 micron, and the magnetic bottom pole piece has a thickness in a range of about 1 micron to about 5 microns.

14. The method of claim 1 wherein the mask has a thickness in a range of about 1 micron to about 7 microns, the insulating gap layer has a thickness in a range of about 0.1 microns to about 1 micron, and the magnetic bottom pole piece has a thickness in a range of about 1 micron to about 5 microns, the insulating gap layer comprises alumina and the magnetic bottom pole piece comprises a nickel iron alloy.

15. A thin film magnetic transducer formed by the method defined in claim 1.

16. A method for manufacturing pole tips in a thin film magnetic transducer of the type used for reading and writing information upon magnetic storage medium, comprising:

depositing a magnetic bottom pole piece upon a nonmagnetic substrate;

depositing an insulating gap layer upon the magnetic bottom pole piece;

depositing photoresist dams on the insulating gap layer, the photoresist dams having opposed negatively sloped profiles defining a three dimensional relief;

depositing a magnetic top pole piece upon the insulating gap layer in the three dimensional relief formed by the photoresist dams, the magnetic top pole piece comprising:

a first surface in surface abutting contact with the insulating gap layer, the first surface having a first surface length; and a second surface positioned distally from the first surface and having a second surface length, the second surface length shorter than the first surface length whereby a profile of the magnetic top pole piece has a generally trapezoidal shape;

depositing a mask upon the second surface of the top pole piece wherein the mask is aligned with the top pole piece; and exposing the mask and the magnetic bottom pole piece to an ion milling source whereby the portions of the magnetic top pole piece which are non-aligned with the magnetic bottom pole piece are removed.

17. The method of claim 16 wherein the mask comprises:

a first surface in surface abutting contact with the second surface of the magnetic top pole piece, the first surface having a first surface length; and a second surface positioned distally from the first surface of the photoresist mask and having a second surface length, the second surface length shorter than the first surface length whereby a profile of the photoresist mask has a generally trapezoidal shape.

18. The method of claim 16 wherein the magnetic top pole has a thickness in a range of about 1 micron to about 5 microns.

19. The method of claim 16 wherein the mask has a thickness in a range of about 1 micron to about 7 microns.

20. The method of claim 16 wherein the insulating gap layer has a thickness in a range of about 0.1 microns to about 1 micron.

21. The method of claim 16 wherein the magnetic bottom pole piece has a thickness in a range of about 1 micron to about 5 microns.

22. The method of claim 16 wherein the mask has a thickness in a range of about 1 micron to about 7 microns and the magnetic bottom pole piece has a thickness in a range of about 1 micron to about 5 microns.

23. The method of claim 16 wherein the mask has a thickness in a range of about 1 micron to about 7 microns, the insulating gap layer has a thickness in a range of about 0.1 microns to about 1 micron, and the magnetic bottom pole piece has a thickness in a range of about 1 micron to about 5 microns.

24. The method of claim 16 wherein the mask has a thickness in a range of about 1 micron to about 7 microns, the insulating gap layer has a thickness in a range of about 0.1 microns to about 1 micron, the magnetic bottom pole piece has a thickness in a range of about 1 micron to about 5 microns, the insulating gap layer comprises alumina and the magnetic bottom pole piece comprises a nickel iron alloy.

25. A thin film magnetic transducer formed by the method defined in claim 16.

* * * * *

UNITED STATES PATENT AND TRADEMARK OFFICE
CERTIFICATE OF CORRECTION

PATENT NO.   :   5,116,719
DATED        :   May 26, 1992
INVENTOR(S)  :   GEORGE J. GAU

It is certified that error appears in the above-identified patent and that said Letters Patent is hereby corrected as shown below:

On the title page: Item [56]:

In the References Cited Section, Under U.S. PATENT DOCUMENTS, delete 4,971,897, insert 4,971,896

Signed and Sealed this

Tenth Day of August, 1993

Attest:

MICHAEL K. KIRK

*Attesting Officer*     Acting Commissioner of Patents and Trademarks

UNITED STATES PATENT AND TRADEMARK OFFICE
CERTIFICATE OF CORRECTION

PATENT NO.  :   5,116,719

DATED       :   MAY 26, 1992

INVENTOR(S) :   GEORGE J. GAU

It is certified that error appears in the above-identified patent and that said Letters Patent is hereby corrected as shown below:

In claim 16, Col. 8, line 16, delete "top", insert "bottom"

In claim 16, Col. 8, line 17, delete "bottom", insert "top"

Signed and Sealed this

Second Day of November, 1993

Attest:

BRUCE LEHMAN

*Attesting Officer*   *Commissioner of Patents and Trademarks*